Feb. 2, 1960     J. E. BLACK     2,923,835
STATIC CONTROL SWITCHING APPARATUS
Filed April 17, 1958     3 Sheets-Sheet 1

INVENTOR.
JOHN E. BLACK,
BY
ATT'YS

Feb. 2, 1960

J. E. BLACK 2,923,835

STATIC CONTROL SWITCHING APPARATUS

Filed April 17, 1958

INVENTOR.
JOHN E. BLACK
BY
Silverman, Mullin & Cass
ATT'YS.

Feb. 2, 1960 J. E. BLACK 2,923,835
STATIC CONTROL SWITCHING APPARATUS
Filed April 17, 1958 3 Sheets-Sheet 3

INVENTOR.
John E. Black
BY
Silverman, Mullin + Cass
attorneys

United States Patent Office 2,923,835
Patented Feb. 2, 1960

2,923,835

STATIC CONTROL SWITCHING APPARATUS

John E. Black, Catlin, Ill., assignor to Electric Eye Equipment Company, Danville, Ill., a corporation of Delaware Application April 17, 1958, Serial No. 729,200

7 Claims. (Cl. 307—88)

This invention relates generally to switching apparatus and more particularly is concerned with novel apparatus for controlling two different systems from a single set of manually actuated means.

In recent years there has been a trend toward the use of static control elements in place of relays for the control of various machine operations, manufacturing processes and methods, the driving of various equipment and the like. The operation of said static control elements in most cases is based upon the use of magnetic amplifiers where controlled conditions of core saturation enable the accomplishment of different functions by the static control elements which correspond to logic in information transmission. The use of the phrase "static control element" herein refers to an assemblage of circuit components "potted" into a block of some insulating material, with contact prongs extending from the block to cooperate with other static control elements and/or receptacles constructed to receive the same. The circuit components include rectifiers, said magnetic amplifiers, resistors, capacitors and the like.

Typical of these static control elements are those using the Ramey circuit, and modifications thereof, manufactured by Westinghouse Electric Corporation, Pittsburgh, Pennsylvania, and sold under the name "Cypak."

The use of these static circuit control elements requires direct current inputs for the control signals to energize the controlled systems. These inputs are usually supplied by manual means, such as switches, push-buttons, and the like, and may also be provided by limit switches, overload switches, and various other means.

For example, a typical installation whose purpose is the control of a drive for a printing press may have a group of control buttons at one station which includes a "Safe-Ready" switch for certain safety procedures, an "Inch" switch for driving the press at a slow speed, a "Slower" switch for decelerating the press, a "Faster" for accelerating the press, a "Stop" switch for stopping the press, a "Pre-Set Paster" switch for setting means into operation to decrease the speed of the press in accordance with a pre-determined function, an "Automatic Accelerate" switch whose function is obvious, and many others.

All of these may be required to control a single unit, which may include one motor, but there may be many such units in a single press and it is desired to control other units as well, usually from the same station. It has been deemed necessary to duplicate a set of controls for each unit. The principal object of this invention is to provide apparatus whereby a single set of switches or push buttons may be used to achieve complete control of at least two such units, and in the broad sense, the invention enables a single set of manual controls to be used to achieve control of at least two systems from the same location or station.

There have been arrangements systems which provide for switching control between systems but these are highly complicated, requiring relays and other apparatus of an involved nature, which, if used, would destroy a great many of the benefits achieved through the use of the static control elements in the responsive systems. Accordingly it is another important object of the invention to provide means for switching the control of the set of manual push-buttons and switches to a selected one of a plurality of systems through the simple change of the phase of the input signals. Ancillary to this object is the provision of means for accomplishing this purpose, namely the shifting of phase of the input signals through the change of the connections to an A.C. line which is connected to rectifiers producing the input signals.

Many other objects will become apparent as a detailed description of the invention as exemplified in a preferred embodiment is set forth hereinafter. In the embodiment which is illustrated diagrammatically, two systems are shown adapted to be controlled by push-buttons at one or more stations. The circuitry for controlling only two functions of each system has been symbolically illustrated, but it will be appreciated that many more functions could as readily be controlled.

The invention is based upon a peculiarity of the static control elements which is inherent in their construction. These static control elements perform several logic functions which dictate their exact construction, but for the most part they all operate on the basis of an approximately square hysteresis loop achieved through the use of inductively reactive elements having cores formed of grain-oriented steel. The functions performed by these static control elements are comparable to relay circuits of the following nature: (a) a circuit in which there are one or more relays in series so that all must be energized for an output to be obtained, this logic function being defined as "AND"; (b) a circuit in which one or more relays are connected in parallel so that any one of the relays being energized will result in an output, this logic function being defined as "OR"; (c) a circuit in which there is a normally closed relay so that when it is energized there is no output, but when it is not energized there is an output, this logic function being defined as "NOT"; and a circuit in which there is a holding circuit for a relay so that the circuit once completed will remain completed until the circuit is opened by other means to relax the held relay, this logic function being defined as "Memory." There are other modifications of these and various combinations, but all of them use rectifiers and most of them have a magnetic amplifier in the circuit.

The peculiarity above referred to is that although the input to these static control elements is a D.C. signal, this signal must be properly phased to match the phase sense of the element. In building systems using a plurality of these static control elements, it is required that the phase of the elements be considered in connecting them together. To the best of my knowledge, however, the input to all the initial elements of systems used has always been a D.C. whose phase was not controlled, supplied by means of a full wave rectifier connected with the voltage reducing transformer for lowering the usual single phase line voltage to some value that can be handled by the static control elements.

Figure 2:
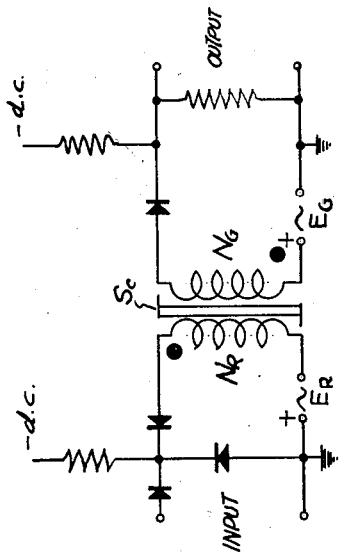
Fig. 2 is a schematic circuit diagram of a static control element of the type used with the apparatus of the invention.

For example, in Fig. 2 there is illustrated the circuit of a single "AND" element, which will not provide an output unless there is an input. The saturable magnetic core Sc has the two windings $N_G$ and $N_R$ in the reset and gating portions of the circuit, respectively. There is an A.C. voltage applied to each portion as indicated at $E_R$ and $E_G$ and a negative D.C. bias applied to each of the gating and reset circuits. Input and output are phase sensitive or selective, notwithstanding the use of rectifiers as shown. The exact nature of the operation of this circuit is well-known and need not be discussed.

In certain logic functions, such as "OR" functions, the magnetic amplifier represented by the saturable core Sc and the gating and reset windings are not used. In any such case, the static control element can be made phase sensitive or selective by the simple addition of an element which will not effect the primary function but which itself is phase sensitive. Thus, an "OR" function element might well comprise merely a group of rectifiers the input to any one of which will result in an output. A single "AND" function element in series with each of these inputs will provide the desired phase sensitivity required for the operation of the invention.

Figure 1:
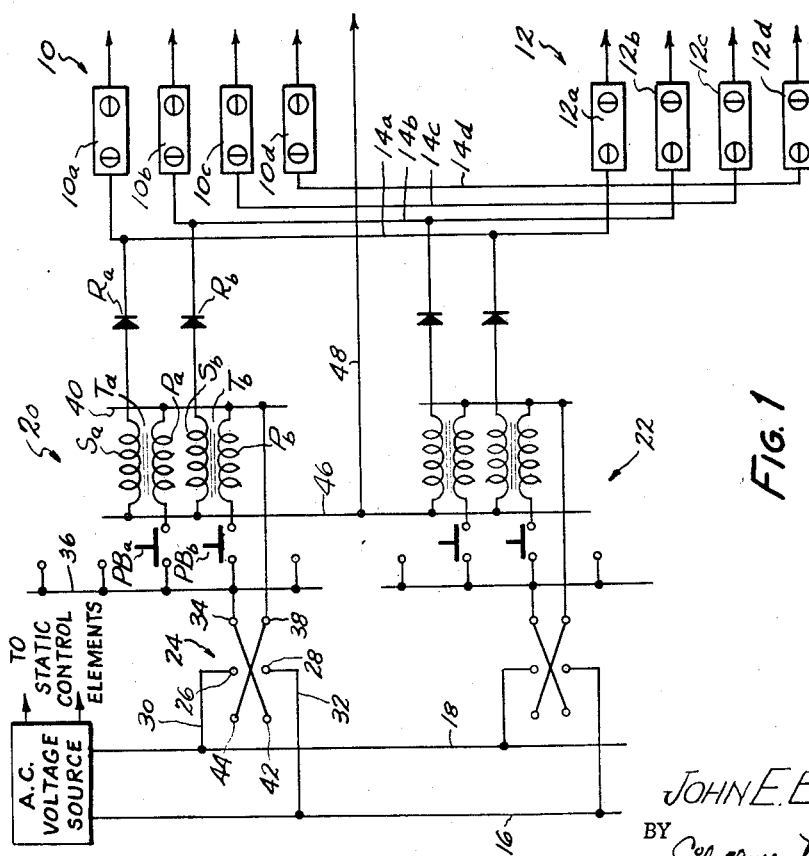
Fig. 1 is a schematic circuit diagram of the apparatus of the invention applied to the control of two systems from two different stations.

In Fig. 1 there is illustrated apparatus which is constructed and controlled in accordance with the invention herein. Two independent systems for control of some operations are illustrated at 10 and 12. These systems are each intended to be controlled through the medium of the static control elements above referred to and the rectangles 10a, 10b, 10c, 10d, etc. represent the initial static control elements of the system 10, while the rectangles 12a, 12b, 12c, 12d, etc. represent the initial static control elements of the system 12. Each static control element of a system is intended to initiate the operation or control the operation of a different function or group of functions for the system. All of the control elements of one system are connected in parallel with equivalent control elements of the other system, and hence elements 10a and 12a are connected by the lead 14a; 10b and 12b are connected by the lead 14b; 10c and 12c are connected by the lead 14c; etc.

Each of the elements 10a to 10d and 12a to 12b (as well as any others which may be included in the respective systems) is phase sensitive in accordance with the nature of the circuit making up the same. The phase sensitivity is related to the phase of the signals applied to the windings of the reset and gating circuits as indicated in Fig. 2 by the plus signs over the left terminal of each of the A.C. power signal inputs $E_G$ and $E_R$. The phase of the input signal voltage will either be such as to coincide with the first or second half-cycle of the phase of the A.C. power input signals, and hence there are two phase conditions, which in practice are identified by the notation $\phi$ and $\theta$ respectively. A D.C. input signal whose phase is of $\phi$ type will not affect a static control element which requires a $\theta$ type of input and vice versa. Obviously, a D.C. signal input which is made up of a signal having both types of signals will affect both types of static control elements.

Figure 3:
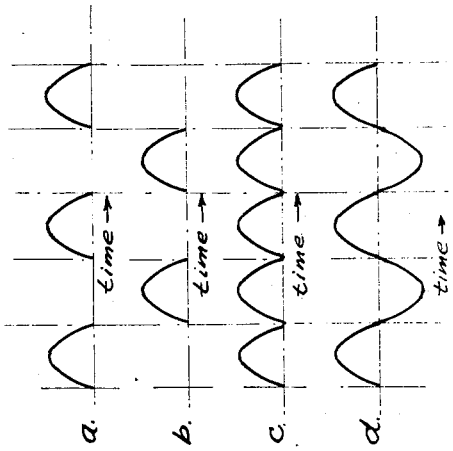
Fig. 3 illustrates the wave shapes of input signals derived from (a) a half-wave rectifier operating at a given phase relative a sinusoidal A.C. wave shown at (d), (b) a half-wave rectifier operating 180° out of phase relative to signal (a), and (c) a full wave rectifier, all signals being related to the identical time base.

To make this clear, in Fig. 3 there are illustrated the outputs of two half-wave rectifiers and a full wave rectifier, all related to an A.C. signal on the same time axis. In (a) the half wave rectifier is so related to the basic sinusoidal wave as to be considered phased $\theta$. It will not energize a $\phi$ element, but will only energize a $\theta$ element. In (b), the phase of the signal has been shifted so that the half waves appear in the signal 180° later in time. This phase would be considered a $\phi$ signal and would only energize a $\phi$ element. In (c) the output being full wave, and a signal appearing for each half cycle of the basic sinusoidal wave, both types of half wave signals are present and hence both types of static elements would be indiscriminately energized by the total signal, albeit on alternate half cycles.

It will be noted that the inputs to the static control elements of the systems 10 and 12 are marked with a symbol which is in accordance with their respective phase sensitivity. This phase sensitivity can be as desired by the user of the system, depending only upon the construction and arrangement of the static control elements. Thus, all of the static control elements of the system 10 have $\phi$ sensitivity, while those of the system 12 have $\theta$ sensitivity. Obviously one type of signal will affect only one type of unit.

The A.C. line is formed of two conductors 16 and 18 which provide the A.C. signals $E_R$ and $E_G$ of the various static control elements of the systems 10 and 12 including others in addition to those illustrated. The power connections to the static control elements are not illustrated. There are two control stations 20 and 22 shown, although the invention is applicable to apparatus including only one such control station. Both stations, as well as any others which may be connected in parallel therewith, can be used to control both systems in a simple manner as will be explained. Only one of these need be set forth in detail.

Considering now the station 20, there is a double-pole double-throw switch 24 connected to the conductors 16 and 18, the center contacts 26 and 28 being connected through leads 30 and 32 respectively to said conductors. The contact 34 connects to a bus 36 while the contact 38 connects with the bus 40. A separate voltage reducing transformer is provided for each logic function to be controlled, and hence there will be a transformer corresponding to each pair of static control elements, that is the corresponding ones of each system. Only two transformers $T_a$ and $T_b$ are illustrated. The bus 40 has one side of each of the primary windings $P_a$ and $P_b$ connected thereto, the other terminals of the primary windings being respectively connected to the bus 36 through push-button switches $PB_a$ and $DB_b$. Obviously there will be a different manual control for each transformer and each pair of static control elements.

The contacts 34 and 38 are crossed with the contacts 42 and 44 respectively so that by switching the blades (not shown) of the switch 24 it is possible to connect the contacts 34 and 38 to the conductors 16 and 18 respectively, or to the conductors 18 and 16 respectively, the effect of which will be to alter the phase of the A.C. voltage applied to the primaries $P_a$ and $P_b$, whichever is connected across the busses 36 and 40 by operation of a push-button.

The secondaries $S_a$ and $S_b$ of the transformers $T_a$ and $T_b$ are connected at one terminal to the bus 46 which leads to a common return 48 related to the static control elements of the systems. The other terminals of the secondary windings are respectively connected through rectifiers $R_a$ and $R_b$ to the leads 14a and 14b respectively. The output from the rectifiers $R_a$ and $R_b$ comprises the pulsed D.C. of Figs. 3a or 3b and hence these rectifiers comprise D.C. pulse producing means. Connections for other transformers which are not illustrated are believed obvious.

The signals appearing between the leads 14a and 14b and the common return 48 are applied to the respective static control elements 10a and 12a, and 10b and 12b. The static elements of each pair (corresponding ones of each system) have the signals applied thereto. Such signals will be D.C. signals consisting of half wave pulses whose phase relation to the reference A.C. signal of Fig. 3 will depend upon the position of the blades of the switch 24. In one position the signals will only affect the static control elements of system 10, while in another position, the signals will only affect the static control elements of system 12.

In this manner, the station 20 can control the operation of both systems 10 and 12 with the push buttons $PB_a$, $PB_b$, etc. merely by throwing the switch 24 one way or the other. Likewise, the same control can be exercised at station 22 and at any other similar station whose outputs are connected to the jumper leads 14 and the common return 48.

Using the basic system as described herein, it is feasible to establish control at one or more stations for two systems in a rather simple manner. A single station could be arranged to control more than two systems through the use of static control elements providing logic functions, working in conjunction with multiple contact manual controls. Under such circumstances, a plurality of phase shifting means would be used.

Figure 4:
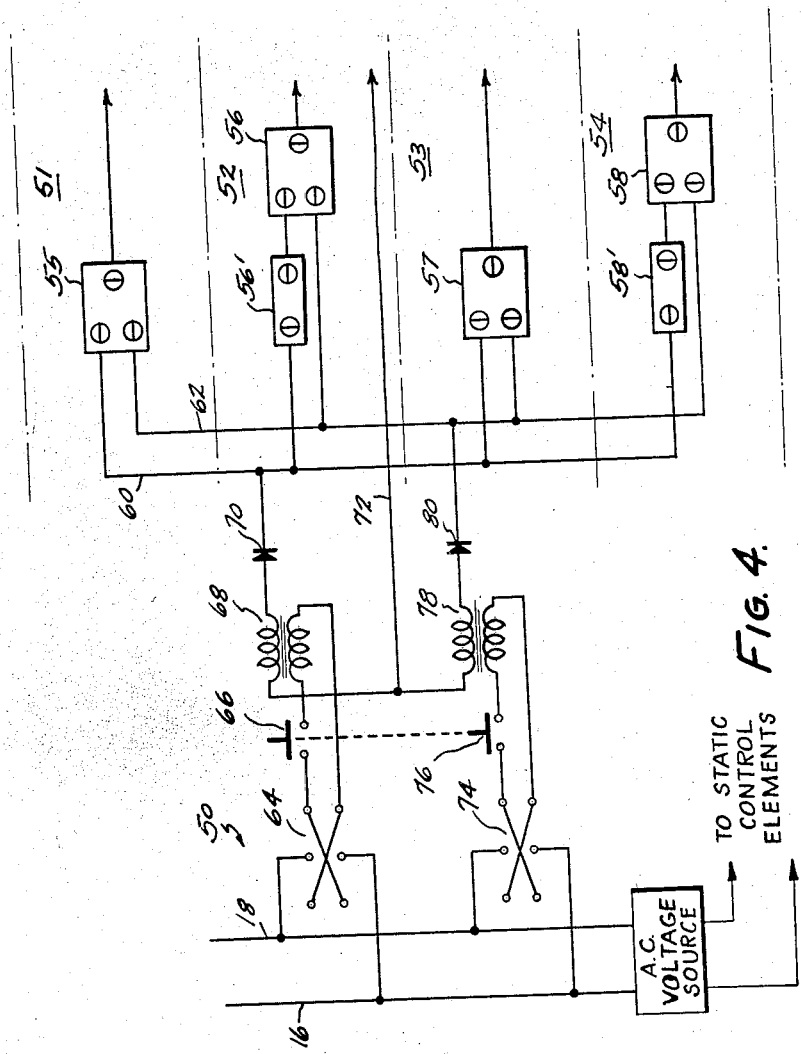
Fig. 4 is a schematic circuit diagram of the apparatus of the invention applied to the control of four systems from a single station.

In Fig. 4 there is illustrated a single station for controlling four systems which are designated respectively, 51, 52, 53 and 54. Each system has a plurality of static control elements, but only the initial ones are shown as an example. The apparatus of Fig. 4 uses "AND" static control elements which have two inputs and single output for the purpose of achieving the switching control from the desired stations. The inputs on any multiple input "AND" static control element are both of the same phase and the output from such an element is of the opposite phase. The output from the initial elements can be applied to other elements to perform a given ultimate function or group of functions. Each system will have functions and groups of functions to perform, and hence there will be other initial static control elements in addition to and similar to the ones illustrated for the particular station.

The system 51 has a static control element 55 which has two $\theta$ inputs and a $\phi$ output. The system 52 has two inputs also, one of which goes directly to the lower input of the static control element 56 and the other of which is applied through a single input static control element 56' prior to its being applied to the upper input of the static control element 56. As indicated by the notation, the inputs of element 56 are both phased $\theta$ but in view of the interposition of the single input element 56' has an $\phi$ input and a $\theta$ output, the effect is that the input to the system 52 is $\phi\theta$. This has been accomplished through the use of a single input "AND" static control element 56' which functions in the circuit as a phase inverter.

In the same manner as described, the system 53 has a double $\phi$ input "AND" static control element 57 as its initial element, and the system 54 has a $\theta\phi$ input which is obtained by the use of a single $\theta$ input static control element 58' operating into the upper input of a double $\phi$ input static control element 58.

It will be noted that each of the systems 51, 52, 53, and 54 has two inputs and one output, although the systems 52 and 54 each have an additional static control element. The upper inputs of all systems are connected to the conductor 60 and the lower inputs are connected to the conductor 62. The signal applied to the conductor 60 is derived from the line 16, 18, applying an A.C. signal through the double-pole double-throw switch 64 and push-button switch 66 to the transformer 68 and the half-wave rectifier 70. The common return is 72. The signal applied to the conductor 62 is derived from the line 16, 18 applying an A.C. signal through double-pole double-throw switch 74 and push-button switch 76 to the transformer 78 and the half-wave rectifier 80.

The push-buttons 66 and 76 are ganged and hence, when they are depressed, both signals are applied simultaneously. The phase of the signals relative the A.C. sinusoidal power signal applied to the static control elements of all systems 51, 52, 53 and 54 depends upon the positions of the blades (not shown) of the switches 64 and 74. Each input is phase-sensitive and the two inputs of each system may have any desired combination of phase sensitivity. Considering that the initial elements of each system perform "AND" functions, there will be an output only when the two inputs are of the particular combination of phase sensitivity. Using the notation which gives the top phase sensitivity first, the systems of Fig. 4 are arranged as follows: all of the initial static control elements of system 51 are connected so that each circuit of that system has $\theta\theta$ phase sensitivity, as shown on element 55; all of the circuits of system 52 are of $\phi\theta$ sensitivity, as shown by considering the input of element 56' and the lower direct input of element 56; all of the circuits of system 53 are of $\phi\phi$ phase sensitivity, as shown on element 57; and all of the circuits of system 54 are of phase sensitivity $\theta\phi$ as shown by the input of element 58' and the lower input of element 58.

Presume that the right hand contacts of switches 64 and 74 produce a $\theta$ D.C. signal out of the rectifiers 70 and 80, while the left hand contacts produce $\phi$ signals. Depressing the push-buttons 66 and 76 will result in the following:

| Position of switch 64 | Position of switch 74 | Signal Input to All Systems | Signal Output Resulting from— |
|---|---|---|---|
| Left | Left | $\phi\phi$ | 57 only |
| Left | Right | $\phi\theta$ | 52 only |
| Right | Right | $\theta\theta$ | 51 only |
| Right | Left | $\theta\phi$ | 54 only |

Figure 5:
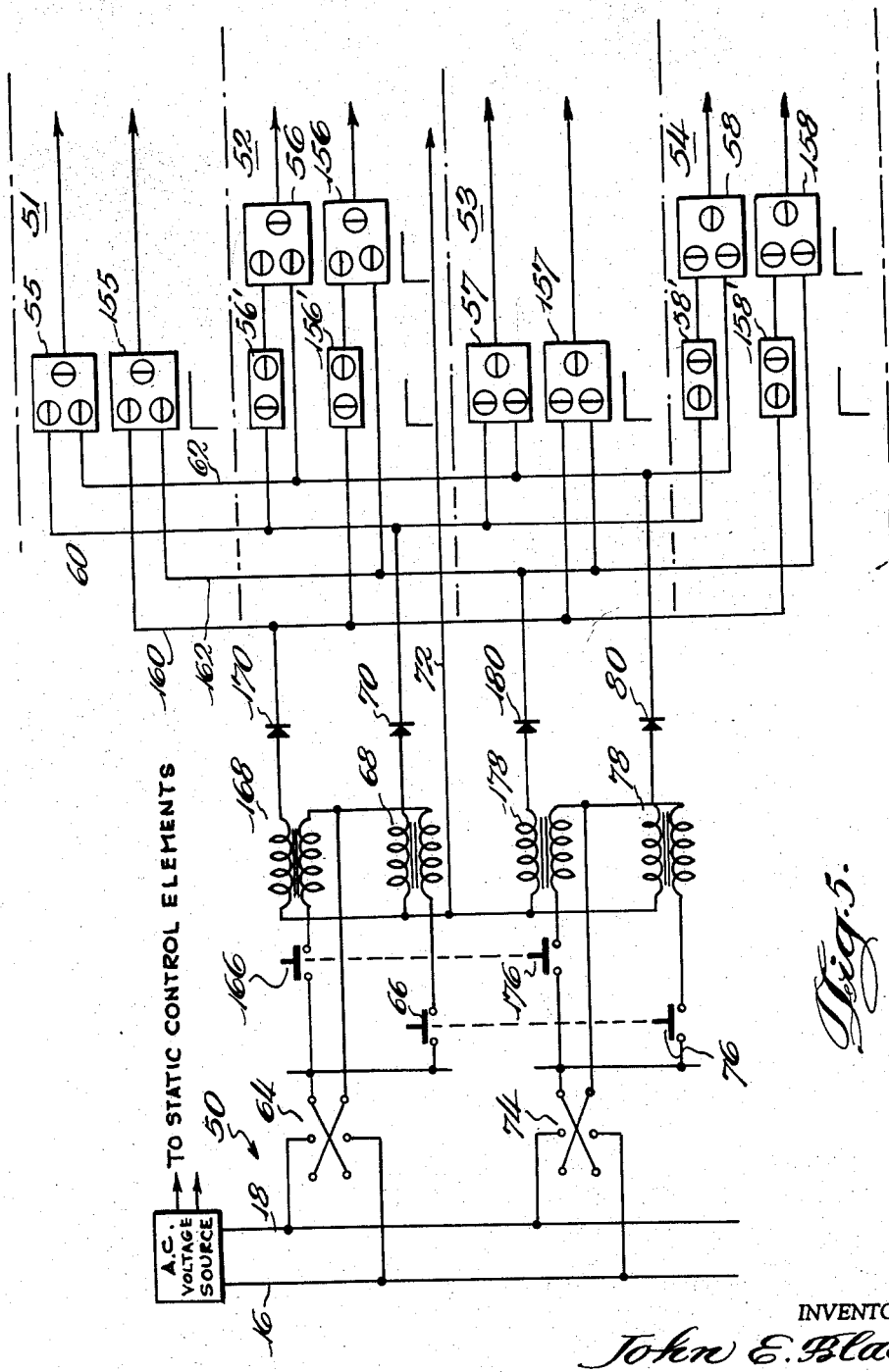
Fig. 5 is a schematic circuit diagram of the same apparatus shown in Fig. 4, but expanded to illustrate a plurality of operations being performed in each system.

The apparatus illustrated in Fig. 4 is simple in order to enable the explanation thereof to be facilitated. Actually, each system has a plurality of static control elements, and one element and the operation controlled thereby is duplicated in each system. In Fig. 5 the apparatus has been expanded to show an additional element in each system. The additional elements will have their push button pair 166 and 176 ganged together, connected in parallel through the switches 64 and 74 with the first described elements. All of the additional components in Fig. 5 have a prefix "1" to indicate the component of Fig. 4 that is duplicated by reason of the addition of the second function in each system. Thus, the systems 51, 52, 53, and 54 have additional respective control elements 155, 156'—156, 157 and 158'—158. (The combined static control elements of alternate systems are considered as the equivalent of a single static control element and hence described as such). The additional functions will be operated by ganged switches 166 and 176, applying D.C. pulses by means of the additional transformers 168 and 178 operating through additional rectifiers 170 and 180. Again, the output obtained will depend upon the position of the switches 64 and 74 and can readily be worked out using the chart set forth above.

Obviously each additional function in the systems will require another static control element in each system, another pair of transformers and rectifiers, and another set of ganged switches.

From the above explanation it will be seen that the circuits of Figs. 4 and 5 enable four completely independent systems to be controlled from a single station, using the same manual controls such as push-buttons. The only manipulation that need be done to switch the control from system to system is to operate both of the double-pole double-throw switches 64 and 74. These may be suitably ganged and marked so that the desired system will be provided with the proper phase of signals. For example, multiple wafer rotary switches are readily worked out having the necessary switching combinations built into them so that the operator need only rotate a single knob to any of four indicated positions.

The invention is of course applied in its simplest form to a single station controlling two systems, using a single double-pole double-throw switch, but the advantages thereof obtain in other more complex circuits which use multiple stations, more than two systems and the like. Although mention has been made in connection with drives for printing presses having many individually powered units, this has been only by way of example. The invention is applicable to a wide variety of uses and purposes, with equally wide variations in the details and arrangements of the parts, circuits, and components without in any way departing from the scope of the invention as set forth in the appended claims.

What it is desired to claim by Letters Patent of the United States is:

1. Apparatus for providing control for a plurality of systems each having a plurality of operations to be performed thereby, said control being accomplished from at least one control station, which comprises: at least two systems each having a plurality of operations to be performed thereby and each operation of one system being substantially the equivalent of a similar operation to be performed by the second system, signal-actuated means associated with each system adapted to receive selective control signals and accomplish the operations, there being a separate signal-actuated means for each operation, each signal-actuated means including a static control element adapted to receive a selective control signal and transmit an enabling signal to initiate an operation, there being a pair of such static control elements for each of said similar pair operations performed one by each of said respective systems, each of said static control elements having a phase-sensitive input whereby unless the phase of the said selective control signal applied thereto matches the phase of the input of said static control element, it will not transmit an enabling signal, all of the static control elements of one system having one input phase sensitivity and all of the static control elements of the second system having a second input phase sensitivity, a signal input channel connected to each of said pair of said static control elements whereby any input signal applied by way of a signal input channel will be applied to said pair of static control elements one each in said first and second systems, a source of electric power of cyclic character, means establishing a fixed phase relationship between said source and all of said static control elements, a control station, circuit means extending each of said channels from its said pair of static control elements to said source and having a multiple condition phase shifting means and circuit closing means in each of said channels at said station, any selected one of said circuit closing means when actuated producing a selective control signal in its said channel of phase dependent upon the condition of said phase shifting means in its said channel and hence effective to produce only an enabling signal at the output of that static control element of the said pair connected to its said channel whose phase sensitivity will accept said last mentioned selective control signal.

2. Apparatus as claimed in claim 1 in which each of said channels comprises a pair of conductors and said phase reversing means comprises a switching device for reversing the connections of said conductors to said source and providing thereby at least two of said conditions.

3. Apparatus as claimed in claim 1 in which said source comprises a two conductor alternating current line, each of said channels includes a pair of two conductor circuits coupled together, said phase shifting device comprising a two-pole reversing switch in one two-conductor circuit for reversing the connection of said conductors with said alternating current line, said circuit closing means comprising a normally open switch in one of the conductors of said first two-conductor circuit, the second two-conductor circuit being connected across the input of the said pair of static control devices of said channel, and having a half-wave rectifier therein whereby the selective control signal applied to both of said static control devices of said pair comprise a half-wave D.C. signal whose phase depends upon the position of said reversing switch.

4. Apparatus as claimed in claim 1 in which each of said static control elements has two pairs of input terminals, and each pair of input terminals has an independent phase relationship relative said source whereby the phase sensitivity of each static control element has two parts and said selective control signal must also have two parts of proper phase to produce said enabling signal, each of said channels including means for applying two signals to each of said pairs of static control elements connected thereto, each of said circuit closing means being formed of at least two switching means, and each of said phase shifting means including at least two parts for independently shifting the phases of the two signals of each channel.

5. Apparatus as claimed in claim 4 in which there is at least an additional system connected in parallel with said first two mentioned systems and having static control devices for similar operations each connected to the said pair of static control devices for said pair of similar operations.

6. Apparatus as claimed in claim 1 in which there are a plurality of said stations of substantially identical construction and having duplicate circuit closing means and phase shifting means connected in parallel with the first-mentioned respective circuit closing means and phase shifting means, whereby said systems may be operated from any one of said stations.

7. Apparatus for providing control for a plurality of systems each having a plurality of operations to be performed thereby, said control being accomplished from at least one control station, comprising: two systems each having a plurality of operations to be performed thereby and each operation of one system being substantially the equivalent of a similar operation to be performed by the second system whereby there are pairs of operations, one of each of the pair being in the separate systems, a control channel for each operation including means actuated by enabling signals for causing said operation to be commenced, each control channel having a static control element at the beginning thereof, each static element having means for producing an enabling signal at its output upon the receipt of a pulsed D.C. signal at its input and each static control element having a pair of terminals comprising the input thereto, one of said terminals of all pairs being connected together to provide a common return conductor, a source of A.C. voltage, a D.C. pulse producing means for each pair of static control units corresponding to each pair of operations, each D.C. pulse producing means having its input connected across A.C. source through a circuit make-break device and a reversing switch, the reversing switch serving to reverse the connection to said pulse producing device to change the phase of the D.C. pulse output thereof, each of said D.C. pulse producing means having two output conductors one of which is connected to said common return and the other of which is connected to both of the second terminals of a said pair of static control devices, means fixing a phase relation between said static control devices and said source, all of the static control devices of one system being phase-sensitive to produce said enabling signals only when the D.C. signal applied to their inputs are of one phase, while all of the static control devices of the second system being phase-sensitive to produce said enabling signals only when the D.C. signal applied to their inputs are of another phase, said phase being controlled by the position of said reversing switches.

No references cited.

UNITED STATES PATENT OFFICE

CERTIFICATE OF CORRECTION

Patent No. 2,923,835                                  February 2, 1960

John E. Black

It is hereby certified that error appears in the printed specification of the above numbered patent requiring correction and that the said Letters Patent should read as corrected below.

Column 2, line 4, for "responsive" read -- respective --.

Signed and sealed this 11th day of October 1960.

(SEAL)
Attest:

KARL H. AXLINE
Attesting Officer

ROBERT C. WATSON
Commissioner of Patents